United States Patent Office 3,439,247
Patented Apr. 15, 1969

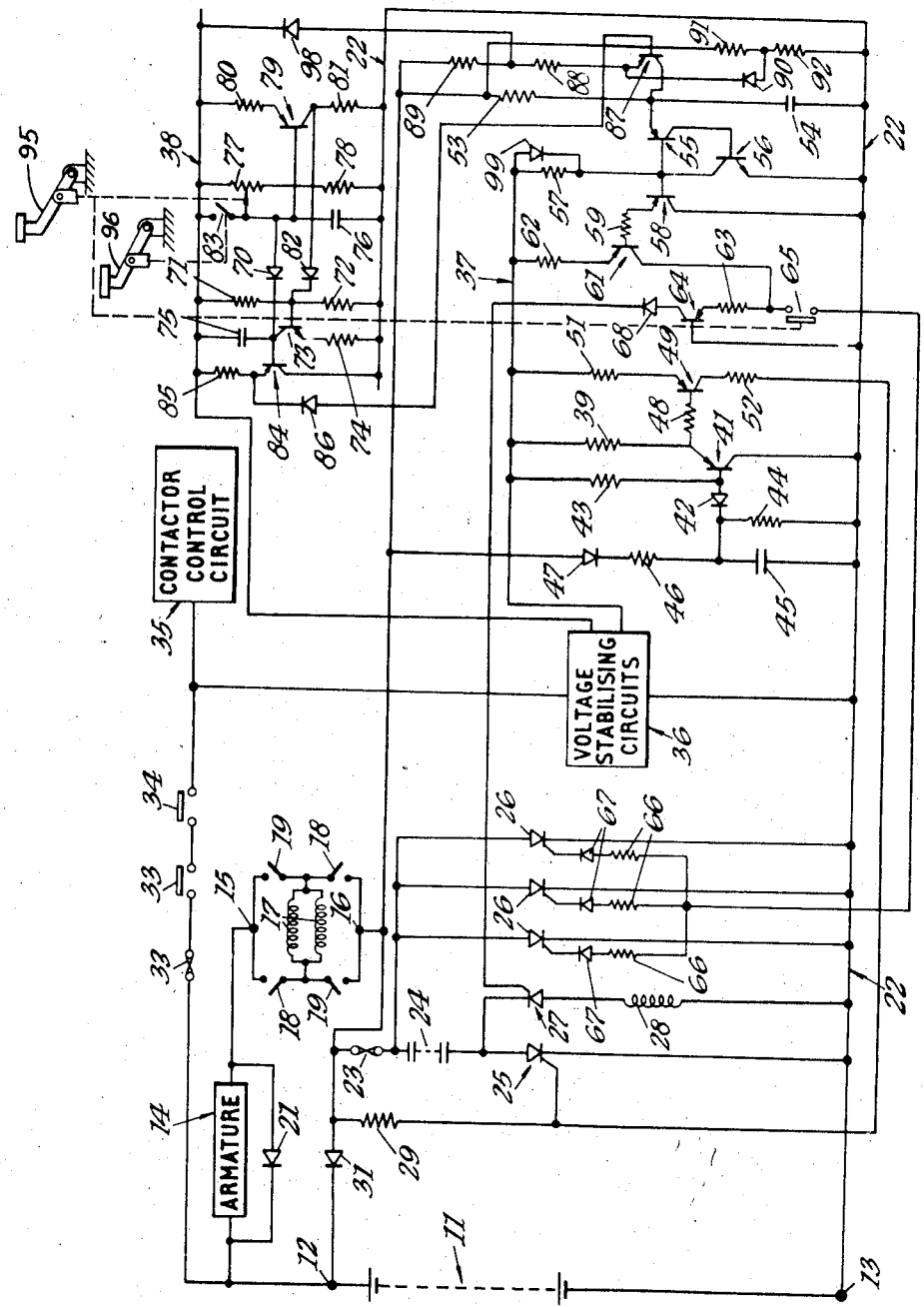

3,439,247
ELECTRICAL CONTROL SYSTEM FOR AN INDUSTRIAL TRUCK
Norman Harold George Palmer, Sutton Coldfield, England, assignor to Eaton Yale & Towne Inc., a corporation of Ohio
Filed Oct. 26, 1965, Ser. No. 505,279
Claims priority, application Great Britain, Nov. 17, 1964, 46,721/64
Int. Cl. H02p 1/22, 1/40, 3/20
U.S. Cl. 318—258                                     8 Claims

ABSTRACT OF THE DISCLOSURE

An industrial truck electrical control system including throttle and brake pedal controls. In depressing the brake pedal to slow the truck, a switch is closed which short circuits the throttle control and reduces drive motor output power, thereby avoiding opposition between the brake and drive motor forces. Upon release of the brake the short circuit is removed and the truck accelerates to the previous speed without re-operating the throttle.

---

This invention relates to a control system for an industrial truck.

A control system according to the invention comprises an electric motor driving the truck, a control circuit operating the motor and including forward and reverse contactors through which a field coil assembly of the motor is alternatively energisable, a throttle pedal associated with the control circuit for controlling the output power of the motor, a brake pedal for operating brakes on the truck, and means operable on depression of the brake pedal for controlling the circuit to the motor so that the output power of the motor is reduced, irrespective of the position of the throttle pedal, but the contactors remain closed.

Referring to the drawing, a circuit diagram illustrating one example of the invention, an industrial truck includes a 36-volt battery 11 having positive and negative output terminals 12, 13, and a drive motor having an armature 14 and a field coil assembly. The field coil assembly includes first and second terminals 15, 16, and first and second field coils 17 connected in parallel. The field coils have opposite ends thereof connected to the terminals 15, 16 respectively through a pair of forward contactors 18 which when closed permit current to flow through the field coils from the terminals 15, 16 in one direction, and in addition opposite ends of the field coils 17 are connected to the terminals 16, 15 respectively through a pair of reverse contactors 19 which when closed permit crurent to flow through the field coils from the terminals 15, 16 in the opposite direction.

The terminal 15 is connected through the armature 14 to the terminal 12, the armature being bridged by a diode 21 having its cathode connected to the terminal 12. The terminal 16 is connected through a series circuit to a negative line 22 connected to the terminal 13, the series circuit incorporating a fuse 23, a capacitor 24 and the anode-cathode path of a controlled rectifier 25. A point intermediate the fuse 23 and capacitor 24 is connected to the anodes of three controlled rectifiers 26 having their cathodes connected to the line 22, whilst a point intermediate the capacitor 24 and the controlled rectifier 25 is connected to the cathode of a controlled rectifier 27 having its anode connected through an inductor 28 to the line 22. The gate of the controlled rectifier 25 is connected to the terminal 16 through a resistor 29, and moreover the terminal 16 is connected through the anode and cathode of a diode 31 to the terminal 12.

The terminal 12 is connected through a fuse 32 and switches 33, 34 in series to a contactor control circuit 35 whereby the driver of the truck can close either the forward or reverse contactors. The detailed operation of the circuit 35 is not important in the present case, but preferably it is as described in application No. 46719/64 filed Nov. 17, 1964, in Great Britain and now Patent No. 1,090,907. The switch 34 is key-operable, and the switch 33 closes when the driver is seated on the truck. Connected across the battery in series with the fuse 32 and switches 33, 34 are voltage stabilising circuits 36 which supply 18 volts to a positive line 37, and 27 volts to a positive line 38. Connected to the positive line 37 through a resistor 39 is the emitter of a p-n-p transistor 41 the collector of which is connected to the line 22 and the base of which is connected directly to the anode of a diode 42, and through a resistor 43 to the line 37. The cathode of the diode 42 is connected to the line 22 through a resistor 44 and a capacitor 45 in parallel, and is connected to the terminal 16 through a resistor 46 and the cathode-anode path of a diode 47 in series. The emitter of the transistor 41 is further connected through a resistor 48 to the base of a p-n-p transistor 49 having its emitter connected to the line 37 through a resistor 51 and its collector connected to the gate of the controlled rectifier 25 through a resistor 52.

Connected in series between the terminal 16 and the line 22 are a resistor 53 and a capacitor 54, a point intermediate which is connected to the emitter of a p-n-p transistor 55 having its collector and base connected respectively to the base and collector of an n-p-n transistor 56 the emitter of which is connected to the line 22. The base of the transistor 55 is connected through a resistor 57 in parallel with the anode cathode path of a diode 99 to the line 37 and is also connected to the base of a transistor 58 the collector of which is connected to the line 22 and the emitter of which is connected through a resistor 59 to the base of a p-n-p transistor 61. The transistor 61 has its emitter connected through a resistor 62 to the line 37 and its collector connected through a resistor 63 to the emitter of a p-n-p transistor 64, and also through a microswitch 65 to one end of each of three resistors 66, the other ends of which are connected through the anode-cathode paths of three diodes 67 respectively to the gates of the controlled rectifier 26. The transistor 64 has its base connected to the line 22, and its collector connected through the anode-cathode path of a diode 68 to the gate of the controlled rectifier 27.

The operation of this part of the circuit is as follows:

Before the driver closes one pair of contactors, the switches 33, 34 are closed and power is supplied from the battery to the voltage stabilising circuits 36. At this stage, the terminal 16 is at zero volts, and consequently, there will be no charge across the capacitor 45. The transistor 41 receives base current by way of resistor 44 and conducts, so permitting conduction of the transistor 49. The transistor 49 supplies gate current to the rectifier 25, which does not at this stage conduct as its anode-cathode voltage is zero.

As soon as the contactors close, the potential at the terminal 16 rises to the positive battery potential, and current flows through the armature 14 and coils 17 to charge the capacitor 24 positively. This current is insufficient to move the truck. At this point the capacitor 45 is charged, so switching off the transistors 41, 49. However, the controlled rectifier 25 is maintained conductive by current flow to its gate through the resistor 29.

When the contactors close, the capacitor 54 also commences to charge through the resistor 53, and when its voltage exceeds 18 volts the transistor 55 conducts. The transistors 55, 56 are interconnected in a known manner so that they act in effect as a controlled rectifier and switch on very rapidly. Consequently, the base voltage of the transistor 58 falls rapidly and the transistors 58, 61 conduct. The microswitch 65 closes when the throttle pedal is depressed beyond a set amount, and provided the microswitch 65 is closed current flows from the transistor 61 to the gates of the controlled rectifiers 26 to switch them on. At the same time, current from the transistor 61 flows through the transistor 64, the gate and cathode of the controlled rectifier 27, and through the controlled rectifier 25 to switch on the controlled rectifier 27. It will be noted that no current flows in the transistor 64 except when the transistor 61 conducts.

As soon as the controlled rectifiers 26 conduct, the voltage at the terminal 16 falls close to zero and the capacitor 54 discharges, so that the transistor 61 ceases to conduct, and no further gate current flows to the controlled rectifiers 26, 27. Before these gate currents cease, however, current from the battery flows through the controlled rectifiers 26 to the motor, this current rising slowly due to the inductive nature of the motor. The motor now drives the truck. At the same time, the capacitor 24 discharges inductively by way of the controlled rectifiers 26, the inductor 28 and the controlled rectifier 27. When the gate currents cease, current still flows to the motor through the controlled rectifiers 26, and the capacitor 24 continues to transfer its charge until the current flowing through the controlled rectifier 27 is insufficient to maintain it on. Thus, the capacitor 24 is left with a negative charge.

When the controlled rectifiers 26 conduct and the voltage at the terminal 16 falls close to zero, the capacitor 45 discharges through the resistor 44, and after a predetermined, fixed time the transistor 41 conducts again and a pulse is applied to the gate of the controlled rectifier 25 as before so allowing the capacitor 24 to discharge and reverse bias the controlled rectifiers 26, so switching them off. The capacitor 24 then re-charges through the controlled rectifier 25 and the cycle continues as before. When the current from the battery to the motor is cut off, the diodes 21, 31 conduct back E.M.F.

The speed of the motor is varied by varying the time taken for the capacitor 54 to charge sufficiently to switch the transistor 55 on, and the way in which this is accomplished will now be described.

Connected between the lines 38, 22 in series are a pair of resistors 71, 72 a point intermediate these resistors being connected to the base of an n-p-n transistor 73 having its emitter connected to the line 22 through a resistor 74 and its collector connected to the line 38 through a capacitor 75.

The collector of the transistor 73 is connected to the cathode of a diode 70 having its anode connected to the slider of a potentiometer and in addition connected through a capacitor 76 to the line 22. The slider is controlled by the throttle pedal 95 of the truck, and moves over a potentiometer resistor 77 connected in series with a resistor 78 across the lines 38, 22.

The slider is further connected to the base of a p-n-p transistor 79 having its emitter and collector connected to the lines 38, 22 through resistors 80, 81 respectively, and its collector connected through the anode-cathode path of a diode 82 to the base of the transistor 73. Moreover, the slider is connected to the line 38 through a normally open switch 83.

There is further provided a p-n-p transistor 84 having its base connected to the collector of the transistor 73, its collector connected to the line 22 and its emitter connected to the line 38 through a resistor 85. The emitter is further connected through the cathode-anode path of a diode 86 to the base of a p-n-p transistor 87 having its collector connected to the junction of resistor 53 and capacitor 54 and its emitter through resistors 88, 89 in series to the terminal 16, which is further connected through resistors 91, 92 in series to the line 22. A point intermediate resistors 91, 92 is connected through the anode-cathode path of a diode 90 to the emitter of the transistor 87. A point intermediate the resistors 88, 89 is connected via the anode-cathode path of a diode 98 to the line 38.

The transistor 73 is biased to conduction and so its collector-emitter current is limited only by the resistors 74, 77. When the throttle pedal 95 is not depressed, the slider is at the end of the resistor 77 nearer the line and so the collector voltage is at a maximum value. Under these conditions, the transistors 84, 87 are both off and and the charging current for the capacitor 54 is limited by the resistor 53. The motor power is now at a minimum value which in practice will be insufficient to move the truck. As the throttle pedal 95 is depressed, the slider moves across the resistor 77, so that the collector voltage of the transistor 73 falls, so causing the transistors 84, 87 to conduct. Current flowing through the transistor 87 charges the capacitor 54, and the more the pedal 95 is depressed, the more transistor 87 conducts, the faster capacitor 54 charges and the faster the speed of the motor.

The capacitor 75 acts as an acceleration control, because when the throttle pedal 95 is depressed the fall of the collector voltage is limited by the charging rate of the capacitor 75.

The arrangement so far described is satisfastory if the speed of the truck is to be increased to an intermediate value, but if top speed is required, the acceleration is limited by the capacitor 75 and the time taken for the truck to attain top speed is in excess of the minimum time within which top speed could be obtained. In order to overcome this problem, the components 79, 80, 81, 82 are incorporated. Since the base of the transistor 79 is connected directly to the slider, the current flowing through the transistor 79 depends on the position of the throttle pedal 95. Except when the throttle pedal 95 is nearly fully depressed, the voltage drop across the resistor 72 exceeds the votlage drop across the resistor 81, and so the diode 82 cannot conduct. However, when the throttle pedal 95 is fully depressed the voltage drop across the resistor 81 exceeds that across the resistor 72, so that the diode 82 conducts and increased base current flows in the transistor 73, so decreasing the time taken for the capacitor 75 to charge and permitting the truck to accelerate more rapidly.

When the driver of the truck is negotiating a corner, he will normally have to apply the brakes of the truck, and so would have to ease the throttle pedal 95. In order to remove the necessity of easing the throttle pedal 95, the switch 83 is included, and is closed when the brake pedal 96 is depressed, so that the slider is connected to the line 38 and the speed of the motor is reduced to a minimum irrespective of the position of the throttle pedal 95. When the corner has been negotiated, the brakes are released and the switch 83 opens. The truck then accelerates to the speed indicated by the throttle pedal 95 at a rate governed by the capacitor 75. It will be noted that the reduction of speed is achieved without opening the contactors. The circuit only allows a very small current in the motor when the brakes are applied, and so minimises overheating of the motor if the controls of the truck are abused by operator.

The switch 83 may be operated hydraulically when the brakes are applied. However, where it is required that other switches, for example lighting switches, are operated when the brakes are applied, a relay having the required number of contacts is included and arranged to be energised on application of the brakes.

What is claimed is:
1. A control system for operating an industrial truck, comprising an electric motor for driving the truck at variable speeds;
  brake means for stopping the truck;
  a power supplied electric control circuit for controlling said motor, said control circuit including means for energizing said motor for forward or reverse rotation, said control circuit including first control means for controlling variable output power of said motor when said motor is energized;

throttle means for actuating said first control means; and said control circuit including second control means for reducing motor output power upon actuation by said brake means, said brake means actuation of said second control means overriding said throttle means for reducing motor output power while maintaining said throttle means in an actuated position and while maintaining said motor in the reduced output energized condition.

2. A control system as defined in claim 1 wherein said brake means includes a brake pedal and wherein said throttle means includes a throttle pedal.

3. A control system as defined in claim 2 wherein said circuit means for energizing said motor for forward or reverse direction are contactors which energize said motor upon being closed.

4. A control system as defined in claim 3 wherein said first control means includes a throttle resistor having a slider and wherein said slider is actuated by said throttle pedal.

5. A control system as defined in claim 4 wherein said second control means is a switch, said switch being actuated by said brake pedal and upon being actuated said switch is effective for short circuiting said throttle resistor for reducing motor output power, said contactors being closed when said switch is actuated.

6. A control system as defined in claim 1 wherein said control circuit includes a transistor having base, collector and emitter electrodes determining output power of said motor when said motor is energized, said transistor being effective for determining the motor output power by the rate of current flow therethrough, said first control means is a throttle resistor having a slider, said slider being connected in the base circuit of said transistor for determining the rate of current flow therethrough, and wherein said throttle means is a throttle pedal, said throttle pedal being connected to said throttle resistor slider.

7. A control system as defined in claim 6 wherein said control circuit includes a capacitor connected to said transistor for limiting the rate of current through said transistor until said capacitor is charged and wherein said control circuit includes a circuit means for increasing the rate of charging said capacitor when said throttle pedal is actuated beyond a predetermined position.

8. A control system as defined in claim 7 wherein said brake means includes a brake pedal and said second control means is a switch, said switch being connected to said brake pedal whereby upon being actuated said switch is effective for short circuiting said throttle resistor for reducing motor output power when said throttle pedal is in actuated position.

References Cited

UNITED STATES PATENTS

| | | | |
|---|---|---|---|
| 3,241,019 | 3/1966 | Gross | 318—17 |
| 3,242,410 | 3/1966 | Cockrell | 318—345 |

FOREIGN PATENTS 700,897  12/1953  Great Britain.

ORIS L. RADAR, *Primary Examiner.*

K. L. CROSSON, *Assistant Examiner.*

U.S. Cl. X.R.

318—337, 345, 372